Nov. 26, 1940.  H. L. CRAIG  2,222,866
BURGLAR GUARD
Filed Aug. 10, 1938
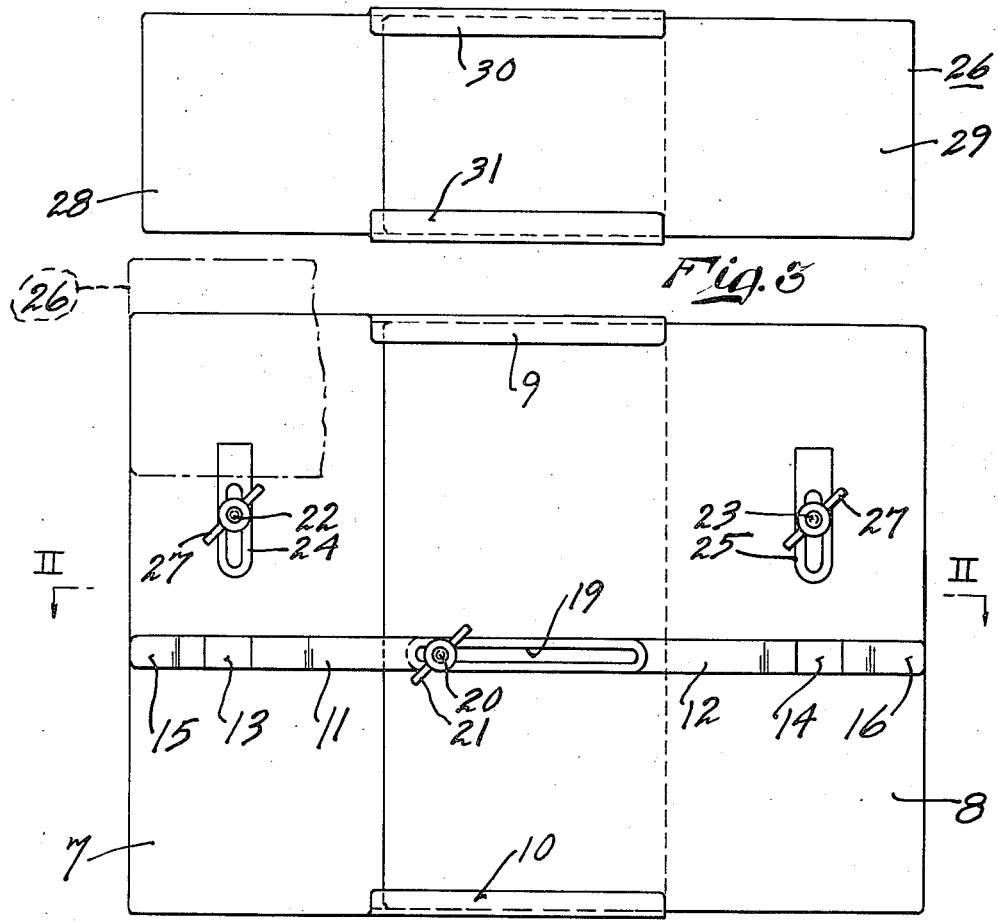
Fig. 3
Fig. 1
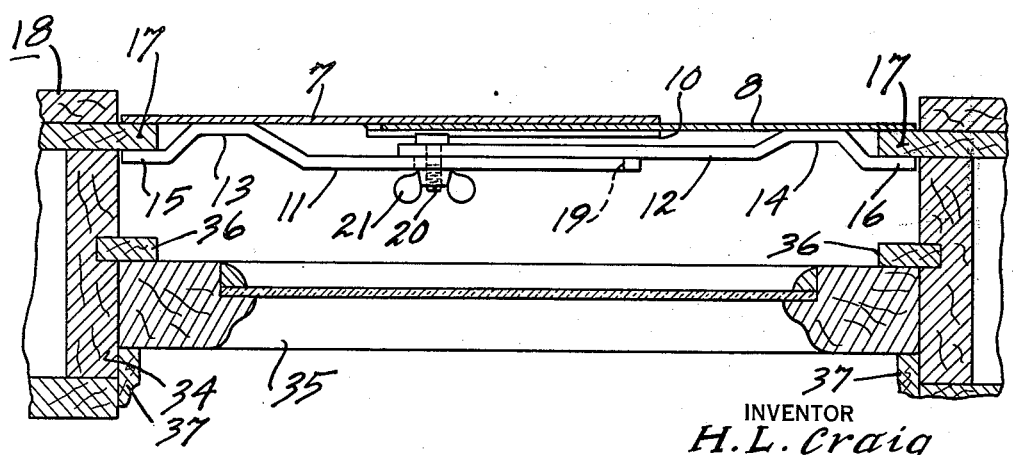
Fig. 2
INVENTOR
H. L. Craig
BY
Charles H. Bassett
ATTORNEY Patented Nov. 26, 1940

2,222,866

UNITED STATES PATENT OFFICE 2,222,866

BURGLAR GUARD

Hugh L. Craig, Homewood, Ala.

Application August 10, 1938, Serial No. 224,021

2 Claims. (Cl. 20—71)

My invention relates to burglar guards and more particularly contemplates the provision of guards adapted to be mounted on the outer side of window frames or door frames of unoccupied houses to protect the window glass against breakage by vandals or the theft of lighting and plumbing fixtures therefrom.

My invention further contemplates the provision of a burglar guard formed of a plurality of metal sheets which are connected to each other but which may be readily adjusted laterally or vertically with respect to each other to tightly engage the walls of window frames of various sizes.

My invention further contemplates the provision of a window or door guard which may readily be mounted in position without the use of nails, screws, brackets, or the like, which mar the finish of the woodwork. The guard is mounted and locked in position by means of locking members which engage behind the window sash stops or door stops and are inaccessible from the outside of the house.

My invention further contemplates the provision of a burglar guard which is particularly adapted for use by insurance and real estate companies and other owners of large numbers of houses which become vacant from time to time. As the guard hereinafter described is adjustable to window frames of various sizes, it may be moved for use from house to house to protect the window panes and fixtures from acts of vandalism which are so common in every large city and thereby pay for their cost and save many dollars which would otherwise be paid to replace broken window panes and lighting and plumbing fixtures.

My invention embodies other novel features, details of construction and arrangement of parts which are hereinafter set forth in the specification and claims and illustrated in the accompanying drawing, forming part thereof, wherein:

Fig. 1 is a view in rear elevation illustrating my improved burglar guard;

Fig. 2 is a sectional view taken along the line II—II of Fig. 1, showing the manner of mounting the burglar guard on a window frame; and Fig. 3 is a view in rear elevation showing a filler body to be mounted on the burglar guard.

Referring now to the drawing for a better understanding of my invention, I show a burglar guard comprising a pair of body members 7 and 8 which are preferably formed of heavy sheet metal. A pair of inturned flanges 9 and 10 are formed on the member 7 to receive and serve as guides for the member 8 which is adjustable laterally with respect to the member 7.

A pair of locking plates 11 and 12 are secured to the back sides of the members 7 and 8, respectively, by welding same thereto at 13 and 14, respectively. The outer ends of the locking plates are bent away from the body members 7 and 8 to provide fingers 15 and 16 for engagement behind the forward window sash stop 17 of the window frame 18. The inner end of the locking plate 11 is slotted at 19 to receive a bolt 20 mounted on the inner end of the plate 12, and the bolt is threaded to receive a wing nut 21 to clamp the ends of the locking plates together.

A pair of threaded bolts 22 and 23, are secured to the body members 7 and 8, respectively, to receive a pair of slotted brackets 24 and 25 employed to clamp a filler body 26 against the back sides of the body members. The brackets are fastened in position on the bolts by means of wing nuts 27. The filler body is substantially the same in construction as the assembled body members 7 and 8 and comprises a pair of filler members 28 and 29 of which, the member 28 is formed with inturned flanges 30 and 31 to receive and serve as guides for the member 29 when same is adjusted laterally. If desired, a pair of locking plates similar to 11 and 12 may be provided on the filler body and to serve in the same manner.

In Fig. 2 I show a double sash window frame 18 comprising the usual pulley stile 34, lower window sash 35, and stop members 17, 36, and 37. In mounting the burglar guard in position on a window frame, the body members are moved in opposite directions until the fingers 15 and 16 of the locking plates engage behind the outer sash stop 17. The wing nut 21 is then tightened to prevent further movement of the body members. If there is any space left between the top of the body members and the top of the window frame, the filler body 26 is employed to fill the space and is secured to the back side of the body members by means of the brackets 24 and 25.

While I have shown my invention in but one form it is obvious to those skilled in the art that it is not so limited but is susceptible of various changes and modifications without departing from the spirit thereof; and I desire, therefore, that only such limitations shall be placed thereupon as are imposed by the prior art.

I claim:

1. A window guard comprising a pair of body members formed of sheet metal, inturned flanges formed on one of said body members to receive and serve as a guide for the other of said body members when the body members are adjusted laterally with respect to each other, a locking plate secured to the back side of each of said body members, locking fingers formed on the outer ends of the locking plates for engagement with a window frame, means for locking said locking plates together, a filler body mounted on the back side of the body members, and means for adjusting the filler body vertically with respect to the body members.

2. A device according to claim 1 in which, the filler body is formed of two sheets of metal which are adjustable laterally with respect to each other.

HUGH L. CRAIG.